Dec. 20, 1960  G. E. BUSKE  2,965,386
LAWN MOWER HANDLE MOUNTING STRUCTURE
Filed Nov. 16, 1956  3 Sheets-Sheet 1

INVENTOR.
GILBERT E. BUSKE
BY
Barnes, Kisselle, Laughlin & Raisch
Attorneys

Dec. 20, 1960  G. E. BUSKE  2,965,386
LAWN MOWER HANDLE MOUNTING STRUCTURE
Filed Nov. 16, 1956  3 Sheets-Sheet 2

INVENTOR.
GILBERT E. BUSKE
BY
Barnes, Kisselle, Laughlin & Raisch
Attorneys

Dec. 20, 1960 G. E. BUSKE 2,965,386
LAWN MOWER HANDLE MOUNTING STRUCTURE
Filed Nov. 16, 1956 3 Sheets-Sheet 3
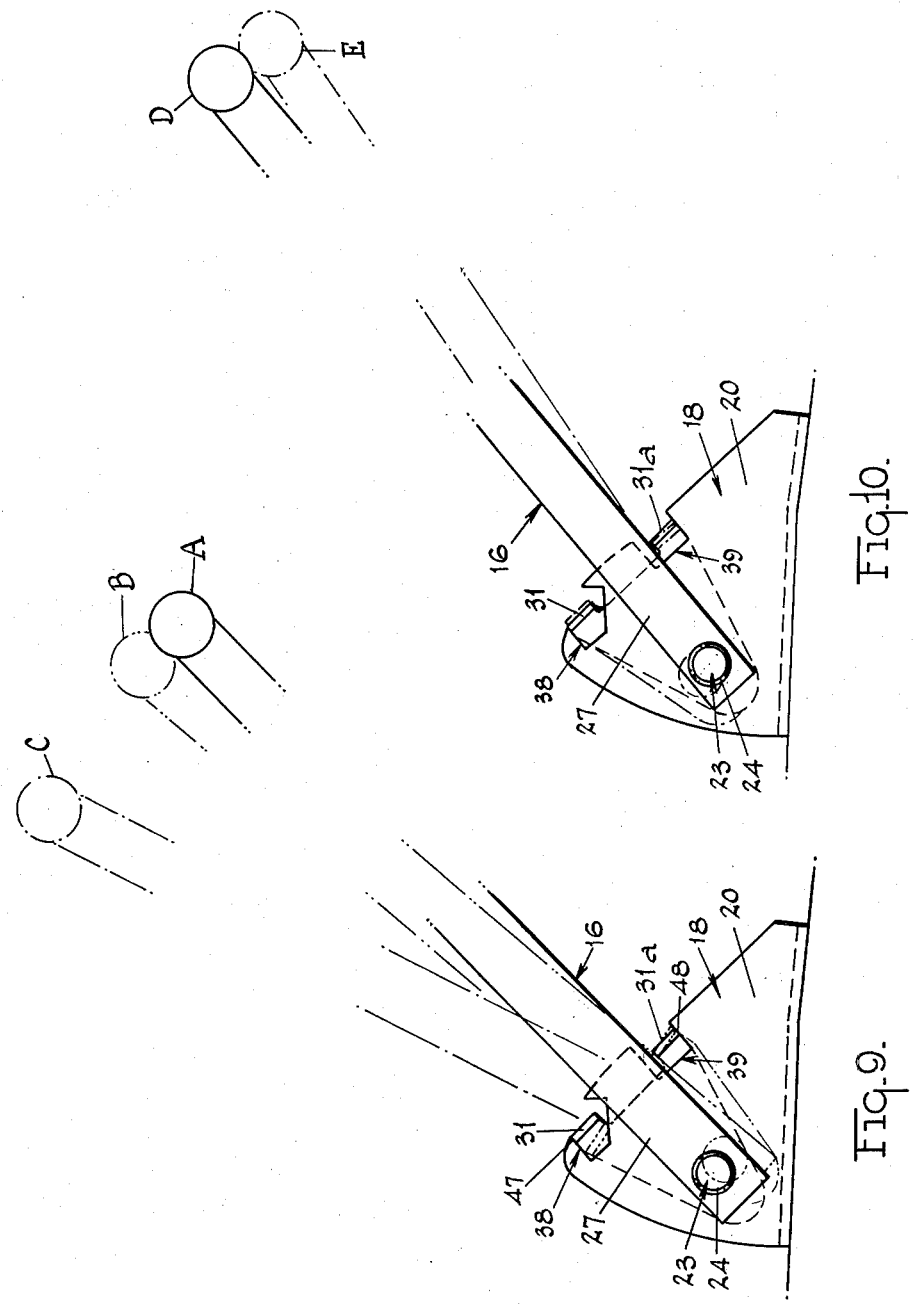
INVENTOR.
GILBERT E. BUSKE
BY
Barnes, Kisselle, Laughlin & Raisch
Attorneys

United States Patent Office 2,965,386
Patented Dec. 20, 1960

2,965,386

LAWN MOWER HANDLE MOUNTING STRUCTURE

Gilbert E. Buske, Lansing, Mich., assignor to Motor Wheel Corporation, Lansing, Mich., a corporation of Michigan Filed Nov. 16, 1956, Ser. No. 622,564

16 Claims. (Cl. 280—47.37)

This invention relates to lawn mowers and particularly to a structure for mounting the handle on a lawn mower of the rotary blade type.

Rotary blade type lawn mowers include a cutting blade mounted for rotation about a vertical axis on a housing which is supported by a plurality of wheels so that the housing is stable as it is moved along the ground. Because such lawn mowers are operated by people of varying heights, it is desirable that the lawn mower handle be adjustable angularly relative to the lawn mower. In addition, in order to prevent fatigue on the operator because of the bobbing up and down of the handle when the mower moves over rough ground, it is desirable that the handle have limited floating, angular movement relative to the housing in any adjusted position. Moreover, since it may be necessary to lift the front wheels of the mower, for example, in turning, a stop should be provided against which the handle may be moved to lift the front end of the mower. A stop is also needed where it is desired to lift the back wheels of the mower or to prevent the mower from rolling back down a slope onto the feet of the operator. It is also desirable to have a storage position wherein the handle may be stored vertically.

It is therefore an object of this invention to provide a structure for mounting the handle on a lawn mower wherein the operating height of the handle can be readily adjusted to accommodate the height of the operator.

It is a further object of this invention to provide such a structure wherein the handle has a limited amount of floating angular movement in any adjusted position.

It is a further object of this invention to provide such a structure wherein the adjustment is stepless, i.e. has an infinite number of adjusted positions within the adjustment range.

It is a further object of this invention to provide such a structure wherein in any adjusted position stops are provided for limiting the angular movement of the handle to permit the lifting of the front or rear wheels of the lawn mower.

It is a further object of this invention to provide such a structure wherein the handle has a vertical storage position.

In the drawings:

Fig. 9 is a fragmentary elevational view showing the several positions of the handle whereby the upper end of the handle is raised.

Fig. 10 is a fragmentary elevational view showing the several positions of the handle whereby the upper end of the handle is lowered.

Figure 1:
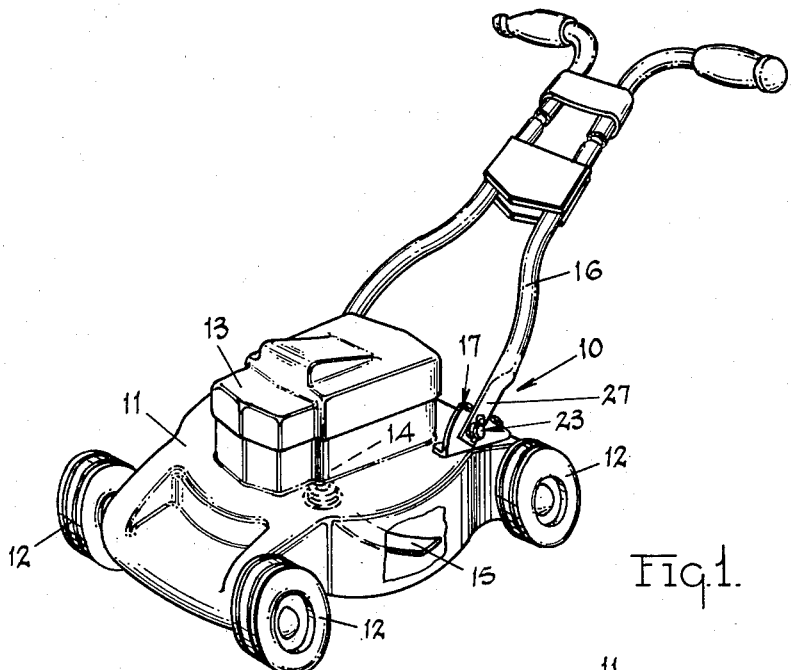
Fig. 1 is a side elevational view of a lawn mower embodying the invention.

Referring to Fig. 1, a rotary type power lawn mower 10 comprises a housing 11 which is mounted on wheels 12 which support the housing for stable movement along the ground. The mower may include four wheels 12, two at the front of the housing and two at the rear of the housing. A power unit 13, such as an internal combustion engine, is mounted on housing 11 and drives a vertical shaft 14 on the lower end of which a rotary cutting blade 15 is mounted for rotation in a horizontal plane. A handle 16 has the lower end thereof pivotally mounted with respect to housing 11 by a mounting structure 17. Handle 16 may be made of tubular material and may be bifurcated, in which case, a mounting structure 17 is provided for each of the lower ends.

Figure 2:
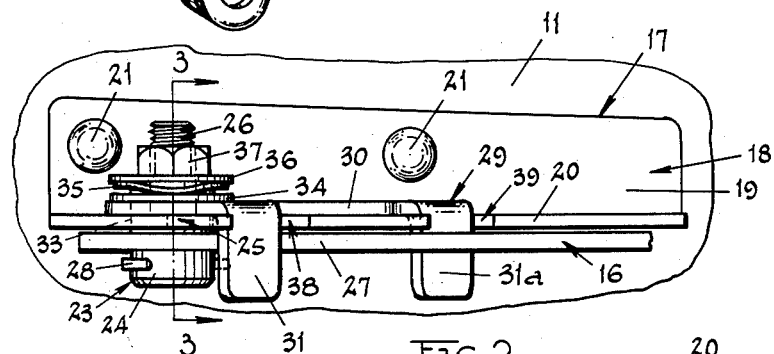
Fig. 2 is a fragmentary plan view of the handle mounting structure, on an enlarged scale.
Figures 3, 4:
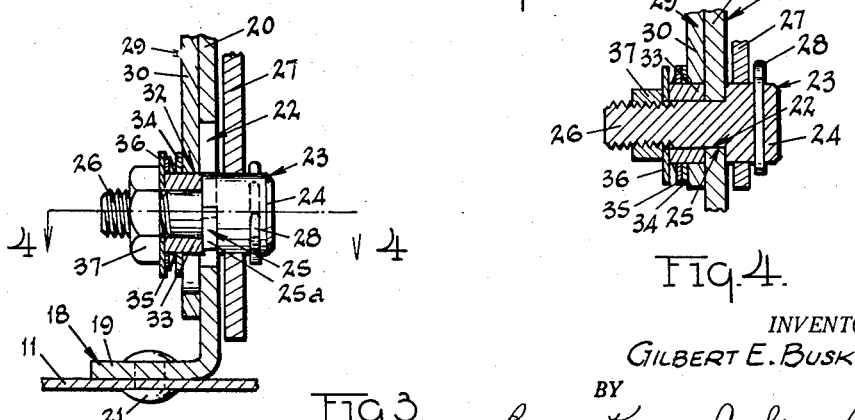
Fig. 3 is a fragmentary sectional view taken along the line 3—3 in Fig. 2.
Fig. 4 is a fragmentary sectional view taken along the line 4—4 in Fig. 3.
Figure 5:
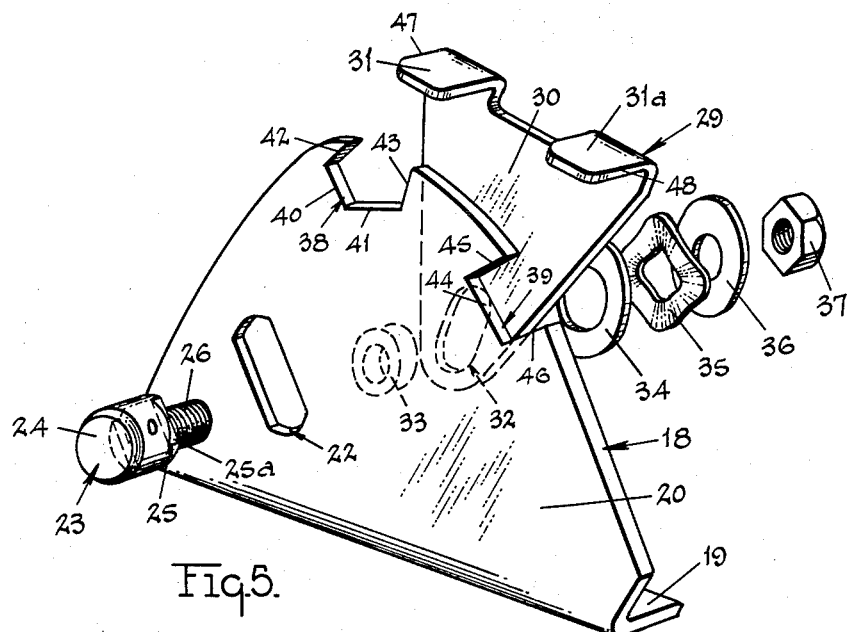
Fig. 5 is an exploded perspective view of the handle mounting structure.

Referring to Figs. 2 through 5, inclusive, mounting structure 17 comprises a bracket 18 including a flange 19 and an upstanding wall 20 at substantially right angles to flange 19. Bracket 18 is fixed on housing 11 by means of rivets 21 passing through flange 19 with the upstanding wall 20 substantially vertical. As shown in Figs. 3 and 5, upstanding wall 20 of bracket 18 is provided with a generally vertically extending slot 22 which extends upwardly and forwardly. A stud 23 has a portion thereof extending through slot 22. Stud 23 has an enlarged cylindrical head 24, an intermediate, non-circular portion 25 and a threaded cylindrical portion 26. The cylindrical head 24 of stud 23 abuts against one surface of upstanding wall 20 and the non-circular intermediate portion 25 passes partially through slot 22. Intermediate portion 25 is made with parallel flats 25a and the width of intermediate portion 25 between flats 25a is substantially the same as the width of slot 22 so that stud 23 is prevented from rotating but may be moved upwardly and downwardly in slot 22.

As shown in Fig. 3, the thickness of the non-circular portion 25 is less than the thickness of upstanding wall 20 in order not to interfere with the tightening of stud 23 by means of nut 37 and spacer 33 as presently described. The lower end of handle 16 is flattened as at 27 and is apertured and pivoted freely on head 24 of stud 23. A cotter pin 28 is provided through the end of head 24 to maintain the lower end of the handle on head 24.

A slider plate 29 is positioned adjacent the other surface of upstanding wall 20 on bracket 18. Slider plate 29 includes a flat, generally triangular body portion 30 and a pair of spaced fingers 31, 31a turned over at substantially right angles to body portion 30. Slider plate 29 is also provided with a slot 32. As shown in Figs. 2 and 3, slider plate 29 is positioned against the other surface of upstanding wall 20 with threaded portion 26 of stud 23 passing through slot 32. A tubular spacer 33 surrounds threaded portion 26, the outer diameter of tubular spacer 33 being substantially equal to the width of slot 32 in slider plate 29. Spacer 33 is longer in dimension than the thickness of body portion 30 of slider plate 29 so that tubular spacer 33 contacts the surface of upstanding wall 20 and projects through and beyond slot 32 in slider plate 29.

A flat washer 34 and wave spring washer 35 are successively mounted on the tubular spacer 33. Flat washer 36, having a hole of substantially the same diameter as threaded portion 26 of stud 23, is then mounted on stud 23 and nut 37 is threaded on threaded portion 26 of stud 23. By this construction, the position of stud 23 vertically in slot 22 is maintained by tightening nut 37 which forces head 24 of stud 23 against one surface of wall 20 and tubular spacer 33 against the other surface of wall 20. At the same time, the position of slider plate 29 relative to upstanding wall 20 is yieldingly maintained by means of the wave spring washer 35. However, slider plate 29 may be moved relative to upstanding wall 20. The force with which spring 35 yieldingly holds slider plate 29 against upstanding wall 20 is limited and maintained constant by abutment of nut 37 and washer 36 against the end of tubular spacer 33.

Figure 6:
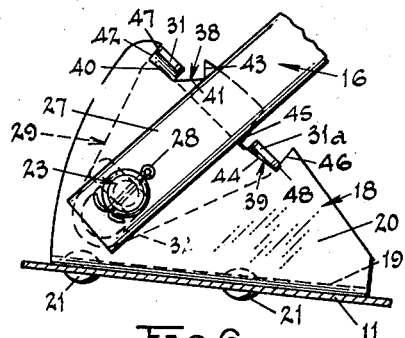
Fig. 6 is a side elevational view of the handle mounting structure.

Referring to Figs. 5 through 8, fingers 31, 31a on slider plate 29 are adapted to engage the sides of notches 38, 39 formed along the upper arcuate edge of upstanding wall 20. As shown in Figs. 5 and 6, notch 38 is provided with diverging side walls 42, 43 and converging bottom walls 40, 41. Notch 39 is provided with a flat bottom wall 44 at substantially right angles to side walls 45, 46. Side wall 42 of notch 38 is substantially parallel to side wall 46 of notch 39, and the distance between side walls 42, 46 is substantially equal to the distance between the opposite edges 47, 48 of the two fingers 31, 31a.

In normal position slider plate 29 is located on plate 20 with fingers 31, 31a in notches 38, 39 and with edges 47, 48 in contact with sides 42, 46, respectively, of the notches (Fig. 6). In this position the upper end of slot 32 engages spacer 33. As shown in Fig. 6, flattened end portion 27 of handle 16 extends upwardly between fingers 31, 31a and the distance between fingers 31, 31a is greater than the width of lower end 27 of the handle so that the handle has limited angular movement between fingers 31, 31a. In addition, fingers 31, 31a serve as stops whereby the front or rear wheels of the lawn mower may be raised. To raise the front wheels of the lawn mower, the handle may be moved downwardly against lower finger 31a. To lift the rear wheels of the lawn mower or to prevent the lawn mower from rolling back on a slope onto the feet of the operator, the handle may be moved upwardly against the uppermost finger 31.

To change the vertical position of the handle in order to accommodate an operator of a different height, nut 37 is loosened and the handle is moved upwardly or downwardly to cause stud 23 to move downwardly or upwardly in slot 22 on upstanding wall 20 of bracket 18. Referring to Fig. 9, in order to raise the adjusted position of the upper end of the handle, for example, from position A to position B, after nut 37 is loosened the upper end of handle 16 is pushed upwardly to position C causing lower end 27 of the handle to fulcrum on upper finger 31 and thereby cam stud 23 downwardly to a new position in slot 22. Nut 37 is then tightened. In the new position B the upper end of the handle 16 is elevated with respect to position A. Fingers 31, 31a serve in the same manner as previously to permit limited angular movement of the handle in its newly adjusted position.

Referring to Fig. 10, in order to lower the adjusted position of handle 16 from position D to position E, after nut 37 is loosened the upper end of the handle is moved downwardly causing lower end 27 of the handle to fulcrum on lower finger 31a and thereby cam stud 23 upwardly to a new position in slot 22. In the new position E the upper end of handle 16 is lowered with respect to position D. When the desired adjustment is made in the handle position, nut 37 is retightened.

In the new position, the pivotal connection of handle 16 relative to bracket 18 has been changed vertically. The limited positions of the upper end of the handle will be at different vertical positions relative to the lawn mower and the ground. In the newly adjusted position spaced fingers 31, 31a will permit limited angular or floating movement of the handle and, in addition, will serve as upper and lower stops in the same manner as in the previously adjusted position.

Figure 7:
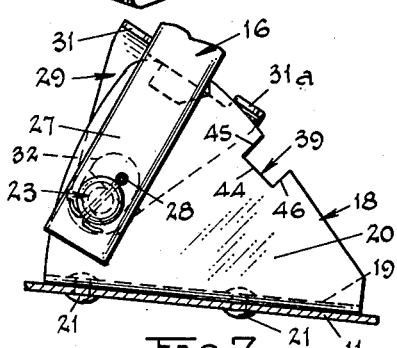
Figs. 7 and 8 are side elevational views similar to Fig. 6, parts being shown in different positions.
Figure 8:
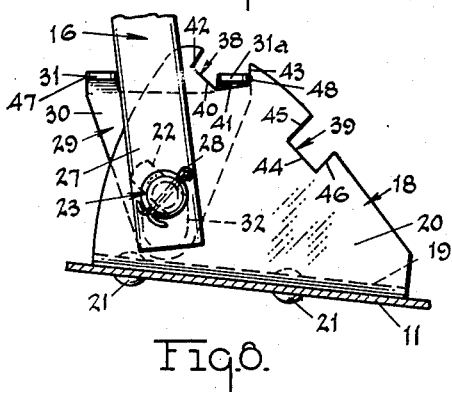

In order to provide a vertical storage of the handle, slider plate 29 is moved upwardly relative to upstanding wall 20 against the action of wavy spring washer 35, as shown in Fig. 7. Slider plate 29 is then rotated to bring the lower finger 31a into alignment with notch 38, and then slider plate 29 is moved downwardly to bring the side of lower finger 31a into engagement with the side of notch 38, as shown in Fig. 8.

I claim:
1. In a lawn mower, the combination comprising a housing, means for supporting said housing for stable movement along the ground, a handle, and means for mounting said handle on said housing comprising a bracket on said housing, means providing a pivotal connection for pivotally mounting the lower end of said handle on said bracket, means for mounting said pivotal connection on said bracket for movement generally vertically of said housing, means for locking said pivotal connection in vertically adjusted position on said bracket a stop member having a pair of spaced stops, means for adjustably mounting said stop member in a plurality of positions on said bracket with the handle extending upwardly between said stops, said stop member being adjustable on said bracket independently of said handle, whereby said stops limit the angular movement of said handle in any adjusted postion of said pivotal connection.

2. The combination set forth in claim 1 wherein said means forming a pivotal connection and said means for mounting said pivotal connection on said bracket comprise a stud on which the lower end of said handle is pivotally mounted, and a slot in said bracket elongated in a generally vertical direction and through which said stud projects.

3. In a lawn mower, the combination comprising a housing, means for supporting said housing for stable movement along the ground, a handle, means for mounting said handle on said housing comprising a bracket mounted on said housing, said bracket having an upstanding wall provided with a slot elongated in a generally vertical direction, a stud extending through said slot, means for pivotally mounting the lower end of said handle on said stud at one side of said upstanding wall, and a plate positioned on the other side of said upstanding wall and having a pair of spaced fingers between which the handle extends upwardly, said fingers serving as stops to limit the angular movement of said handle, means for locking said stud in adjusted position in said slot, whereby the height of the upper end of the handle relative to the housing may be changed by releasing said means for locking said stud in position on said upstanding wall and moving the handle downwardly or upwardly to move the stud upwardly or downwardly in the slot.

4. The combination set forth in claim 3 wherein said means for pivotally mounting the lower end of said handle on said stud comprises an enlarged head on said stud, the lower end of said handle being formed with an opening into which said enlarged head projects, and means for preventing the lower end of the handle from moving axially off the stud.

5. The combination set forth in claim 3 including means for yieldingly mounting said plate for pivotal movement about the axis of said stud and for movement in a direction radially of said stud comprising a slot in said plate through which said stud extends, said means for locking said stud in adjusted position in said slot also frictionally holding said plate in adjusted position against said upstanding wall.

6. The combination set forth in claim 5 wherein said means for locking said stud in adjusted position in said slot and frictionally holding said plate against said upstanding wall comprises a nut threaded on said stud, and the means for yieldingly mounting said plate further comprising spring means interposed between said nut and said plate.

7. The combination set forth in claim 6 wherein said upstanding wall of said bracket has a plurality of notches formed in the upper edge portion thereof, said fingers on said plate being adapted to engage said notches and thereby prevent rotational movement of said plate relative to said bracket.

8. The combination set forth in claim 4 wherein said means for locking said stud in position in the slot in said upstanding wall of the bracket comprises a tubular spacer surrounding the shank of said stud, said spacer having an external diameter greater than the width of said slot and having one end thereof in contact with one side of said upstanding wall, the enlarged head of said stud bearing against the other side of said upstanding wall and a nut threaded on said stud and applying a force to said tubular spacer to force said tubular spacer against said upstanding wall.

9. In a lawn mower, the combination comprising a housing, means for supporting said housing for stable movement along the ground, a handle, means for adjustably mounting said handle for pivotal movement on said housing comprising a pivotal connection between said housing and the lower end of said handle, means for mounting said pivotal connection on the housing for movement generally vertically of said housing, means for locking said pivotal connection in vertically adjusted position on said housing, means comprising a pair of spaced stops, said handle projecting upwardly through said stops whereby the angular movement of said handle is limited by said stops, and means for mounting said stops on said housing for movement thereon independently of said handle from a first position wherein the handle is limited to a generally inclined operating position to a second position wherein the handle is disposed in a generally upright inoperative position.

10. The combination set forth in claim 9 wherein said stops comprise a plate fashioned with a pair of fingers projecting from the plane of the plate and between which the handle projects, said plate being supported on said housing at said pivotal connection.

11. In a lawn mower, the combination comprising a housing, means for supporting said housing for stable movement along the ground, a handle, means for adjustably mounting said handle for pivotal movement on said housing comprising a pivotal connection between said housing and the lower end of said handle, means for mounting said pivotal connection on the housing for movement generally vertically of said housing, means for locking said pivotal connection in vertically adjusted position on said housing, a plate fashioned with a pair of fingers projecting from the plane of the plate and between which the handle projects, and means for supporting said plate on said housing for movement independently of said handle and said housing radially of said pivotal connection and pivotally of said pivotal connection, said plate and housing having portions thereof which are engageable and disengageable in response to movement of said plate radially toward and away from said pivotal connection to permit pivotal movement of the plate to a plurality of different fixed positions relative to said housing.

12. In a lawn mower, the combination comprising a housing, means for supporting said housing for stable movement along the ground, a handle, means for mounting said handle on said housing comprising a bracket mounted on said housing, said bracket having an upstanding wall provided with a slot elongated in a generally vertical direction, the longitudinal axis of said slot forming an angle of less than 90° with the horizontal, a stud extending through said slot, a tubular spacer surrounding said stud, said spacer having a greater external diameter than the width of said slot and having one end thereof in contact with said upstanding wall, a nut threaded on said stud and applying a force to said tubular spacer to force said tubular spacer against said upstanding wall, means for pivotally mounting the lower end of said handle on said stud at one side of said upstanding wall, and a plate positioned on the other side of said upstanding wall and having a pair of spaced fingers between which the handle extends upwardly, said fingers serving as stops to limit the angular movement of said handle, whereby the height of the upper end of the handle relative to the housing may be changed by loosening said nut and moving the handle downwardly or upwardly to move the stud upwardly or downwardly in the slot, the axis of the handle in operative position extending generally transversely of the longitudinal axis of said slot in said bracket.

13. In a lawn mower, the combination comprising a housing, means for supporting said housing for stable movement along the ground, a handle, means for mounting said handle on said housing comprising a bracket mounted on said housing, said bracket having an upstanding wall provided with a slot elongated in a generally vertical direction, the longitudinal axis of said slot forming an angle of less than 90° with the horizontal, a stud extending through said slot, a tubular spacer surrounding said stud and having one end thereof in contact with said upstanding wall, a nut threaded on said stud and applying a force to said tubular spacer to force said tubular spacer against said upstanding wall, means for pivotally mounting the lower end of said handle on said stud at one side of said upstanding wall comprising an enlarged head on said stud, the lower end of said handle being formed with an opening into which said enlarged head projects, and a plate positioned on the other side of said upstanding wall and having a pair of spaced fingers between which the handle extends upwardly, said plate having a generally vertical slot therein through which said stud extends, spring means interposed between said nut and said plate, said fingers serving as stops to limit the angular movement of said handle, whereby the height of the upper end of the handle relative to the housing may be changed by loosening said nut and moving the handle downwardly or upwardly to move the stud upwardly or downwardly in the slot, the axis of the handle in operative position extending generally transversely of the longitudinal axis of said slot in said bracket, the longitudinal axis of the slot in said plate forming an angle with the longitudinal axis of the slot in said bracket when said handle is in operative position.

14. In a lawn mower, the combination comprising a housing, means for supporting said housing for stable movement along the ground, a handle, and means for mounting said handle on said housing comprising a bracket on said housing, means providing a pivotal connection for pivotally mounting the lower end of said handle on said bracket, means for mounting said pivotal connection on said bracket for movement generally vertically of said housing, a stop member having a pair of spaced stops, means for adjustably mounting said stop member in a plurality of positions on said bracket with the handle extending upwardly between said stops whereby said stops limit the angular movement of said handle in any adjusted position of said pivotal connection, said means providing a pivotal connection comprising a stud on which the lower end of said handle is pivotally mounted, said means for mounting said pivotal connection on said bracket comprising a slot in said bracket elongated in a generally vertical direction and through which said stud projects, and means for locking said stud in any vertically adjusted position in said slot, said stop member having a slot therein, said stud projecting through said slot, said means for locking said stud in any vertically adjusted position including means for yieldingly forcing said stop member against said bracket, said means for yieldingly forcing said member against said bracket including a wavy spring washer.

15. In a lawn mower, the combination comprising a housing, means for supporting said housing for stable movement along the ground, a handle, and means for mounting said handle on said housing comprising a bracket on said housing, means providing a pivotal connection for pivotally mounting the lower end of said handle on said bracket, means for mounting said pivotal connection on said bracket for movement generally vertically of said housing, a stop member having a pair of spaced stops, means for adjustably mounting said stop member in a plurality of positions on said bracket with the handle extending upwardly between said stops whereby said stops limit the angular movement of said handle in any adjusted position of said pivotal connection, said means providing a pivotal connection comprising a stud on which the lower end of said handle is pivotally mounted, said means for mounting said pivotal connection on said bracket comprising a slot in said bracket elongated in a generally vertical direction and through which said stud projects, and means for locking said stud in any vertically adjusted position in said slot, said stop member having a slot therein, said stud projecting through said slot, said means for locking said stud in any vertically adjusted position including means for yieldingly forcing said stop member against said bracket.

16. In a lawn mower, the combination comprising a housing, means for supporting said housing for stable movement along the ground, a bracket mounted on said housing, said bracket having an upstanding wall provided with a slot elongated in a generally vertical direction, a longitudinal axis of said slot forming an angle of less than 90° with the horizontal, a stud extending through said slot, a handle pivoted on said stud, means for locking said stud in adjusted position in said slot, and means on said bracket spaced radially from the pivot of said handle to said stud and engageable with said handle for limiting the angular movement of said handle, whereby the height of the upper end of the handle relative to the housing may be changed by releasing said means for holding said stud in position on said upstanding wall and moving the handle downwardly or upwardly to move the stud upwardly or downwardly in the slot, the axis of the handle in operative position extending generally transversely of the longitudinal axis of said slot in said bracket.

References Cited in the file of this patent

UNITED STATES PATENTS

| | | |
|---|---|---|
| 843,770 | Ruton | Feb. 12, 1907 |
| 2,484,795 | Schofield | Oct. 11, 1949 |
| 2,716,559 | Boyce | Aug. 30, 1955 |
| 2,727,753 | Johnson et al. | Dec. 20, 1955 |
| 2,757,013 | Brier | July 31, 1956 |
| 2,763,492 | Phelps | Sept. 18, 1956 |